March 3, 1970     T. GASKINS     3,498,399
VEHICLE WITH VERTICALLY ADJUSTABLE DRIVEN WHEELS
Filed Dec. 27, 1966     3 Sheets-Sheet 1
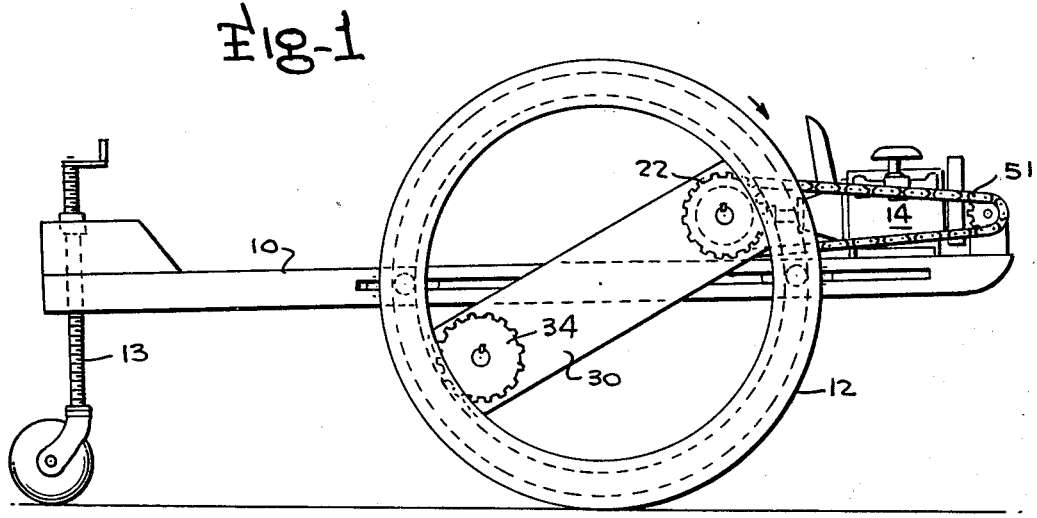
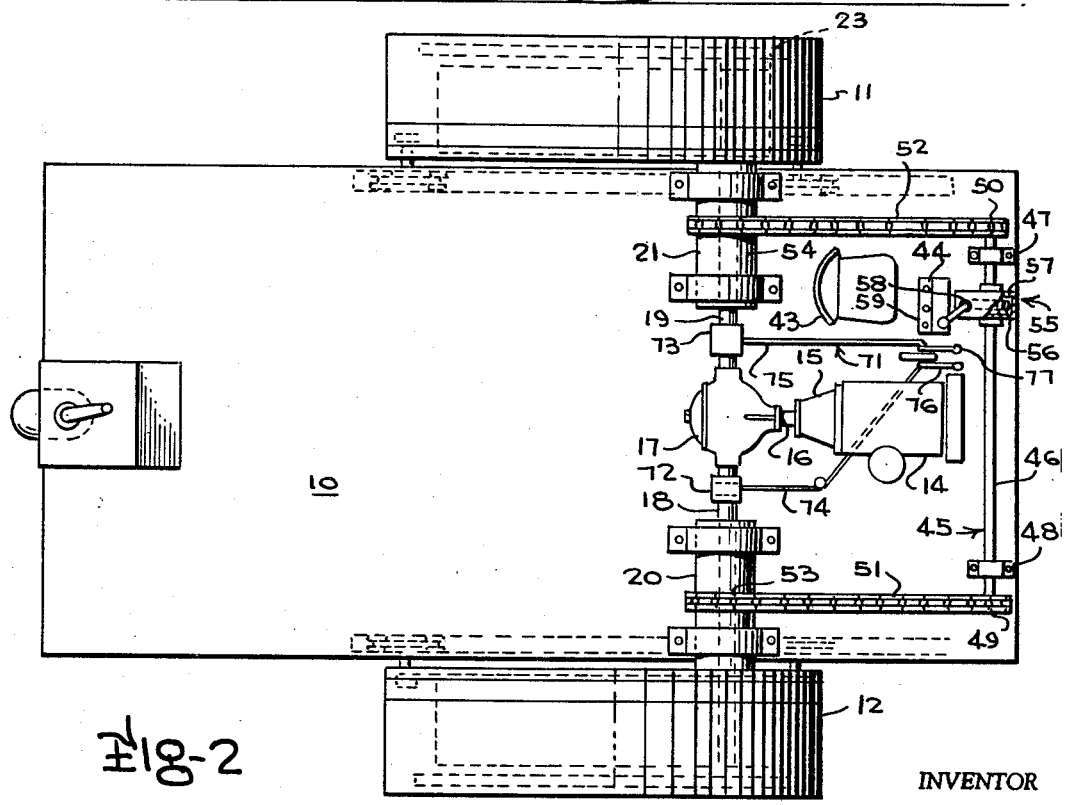
INVENTOR
THOMAS GASKINS
BY Mason, Fenwick & Lawrence
ATTORNEYS

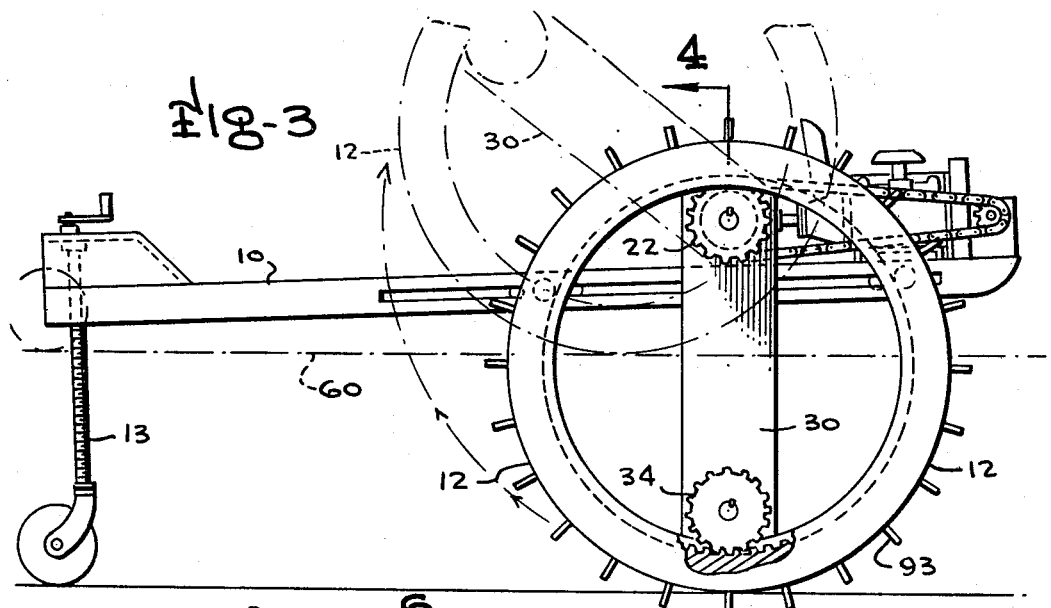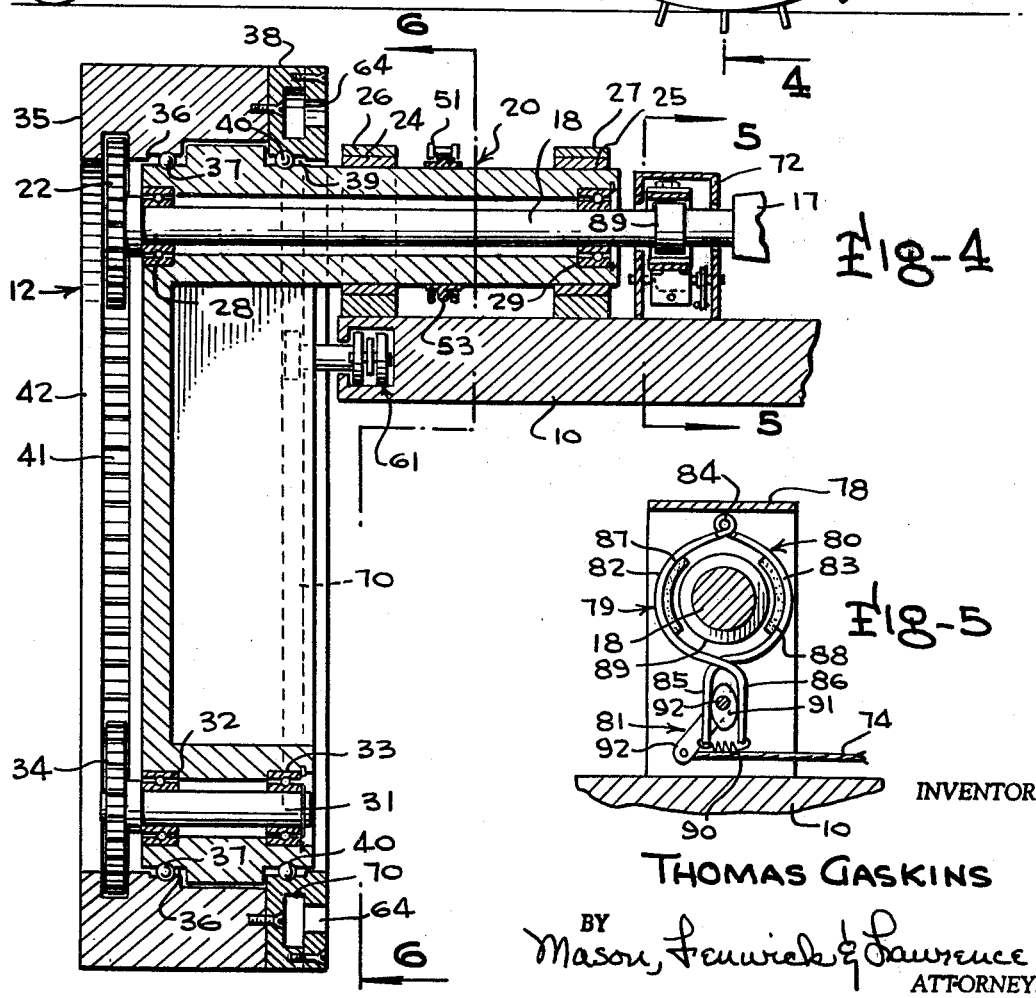

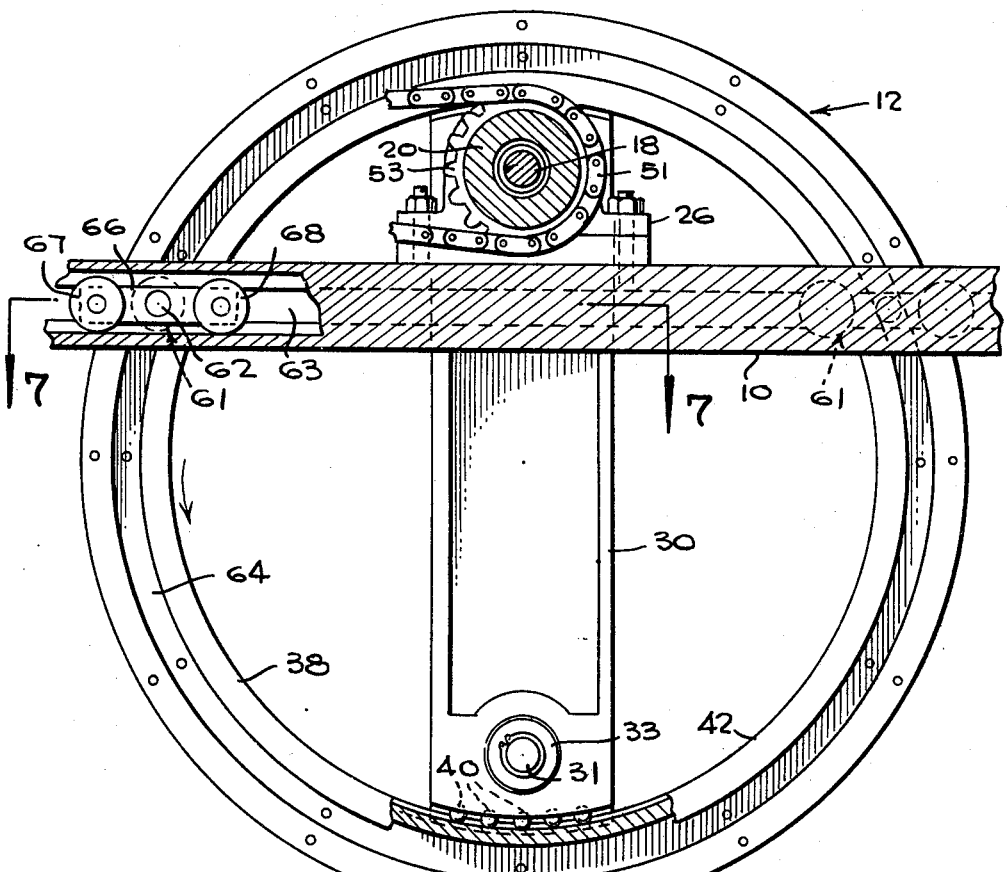
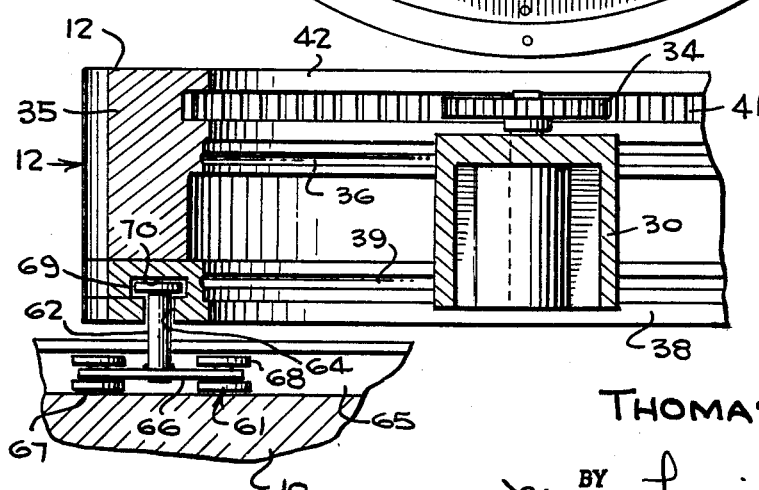

United States Patent Office 3,498,399
Patented Mar. 3, 1970

3,498,399
VEHICLE WITH VERTICALLY ADJUSTABLE DRIVEN WHEELS
Thomas Gaskins, Palmdale, Fla. 33944
Filed Dec. 27, 1966, Ser. No. 605,074
Int. Cl. B62d 55/00, 11/00, 21/00
U.S. Cl. 180—10                                11 Claims

ABSTRACT OF THE DISCLOSURE

A vehicle comprising a chassis, at least one pair of first and second coaxially disposed shafts mounted on the chassis, the shafts being rotatable independently of each other, a support arm member secured to the first shaft for rotation therewith, a wheel rotatably mounted on the end portions of the arm member whereby the arm member is disposed diametrically relative to the wheel and means for transmitting drive from the second shaft to the wheel for rotating the wheel about its axis.

---

This invention relates to a vehicle and more particularly to a novel vehicle capable of traversing irregular terrain and bodies of water.

In the prior art there are numerous types of vehicles which are intended to travel over irregular terrain and bodies of water. It has been found, however, that such prior art vehicles are not entirely satisfactory in construction and performance. It, therefore, has been found desirable to develop a vehicle having a relatively simple construction which is effective in readily traversing irregular terrain and bodies of water.

Accordingly, the principal object of the present invention is to provide a novel vehicle.

Another object of the present invention is to provide a novel vehicle capable of readily traversing irregular terrain.

A further object of the present invention is to provide a novel vehicle which is capable of traversing terrain having irregular obstacles in the path of the vehicle.

A still further object of the present invention is to provide a novel vehicle which is capable of traversing both irregular land terrain and bodies of water.

Another object of the present invention is to provide a novel vehicle having a chassis which can be elevated even while in transit.

A further object of the present invention is to provide a novel vehicle capable of traversing irregular terrain and bodies of water which is comparatively simple in construction, easy to assemble, and economical to operate.

Other objects and advantages of the present invention will become more apparent to those persons skilled in the art, from the following description taken in conjunction with the accompanying drawings, wherein:

FIGURE 1 is a side elevational view of an embodiment of the invention;

FIGURE 2 is a top view of the embodiment illustrated in FIGURE 1;

FIGURE 3 is a side elevational view of the embodiment illustrated in FIGURES 1 and 2, depicting the components thereof in a sequential position;

FIGURE 4 is an enlarged cross-sectional view taken along line 4—4 in FIGURE 3, having a portion thereof broken away;

FIGURE 5 is an enlarged cross-sectional view taken along line 5—5 in FIGURE 4;

FIGURE 6 is a cross-sectional view taken along line 6—6 in FIGURE 4; and

FIGURE 7 is a cross-sectional view taken along line 7—7 in FIGURE 6.

Briefly described, the present invention relates to a vehicle generally comprising a chassis, at least one wheel rotatable about its center axis mounted on the chassis for supporting the chassis, and means mounted on the chassis operatively connected to the wheel for rotating the wheel about an axis radially offset from the center axis of the wheel. Preferably, the axes of rotation of the wheel are parallel, and the vehicle includes prime mover means mounted on the chassis for rotatably driving the wheel about its center axis for propelling the vehicle, and braking means for the wheel.

In a more specific embodiment of the invention, there is provided a vehicle comprising a chassis, at least one shaft journaled in the chassis, the shaft having a support arm radially disposed relative to the axis of rotation of the shaft and rotatable about the axis of the shaft, an annular wheel rotatably mounted on the support arm for rotational movement about an axis disposed parallel and radially offset relative to the axis of the shaft on which the support arms is mounted, whereby the arm member is diametrically disposed relative to the wheel, a second drive shaft journaled coaxially in the first mentioned shaft, having a drive gear meshing with a gear disposed on the wheel for transmitting drive therebetween rotatively driving the wheel and thereby propelling the vehicle, and means for maintaining the wheel in a fixed plane of rotation comprising at least one retaining pin received in a rectilinear slot in the chassis and an annular slot in the wheel.

Referring to the drawings, there is illustrated an embodiment of the invention. The embodiment generally includes a chassis 10, a pair of forwardly mounted wheels 11 and 12 which are transversely spaced, and a rearwardly disposed wheel unit 13 which is mounted on the longitudinal centerline of the vehicle. Centered on the forward portion of the chassis is an engine 14 having a transmission 15 and a rearwardly extending drive shaft 16 operatively connected to a universal gear assembly 17. Operatively connected to the universal gear assembly 17 and extending laterally therefrom are drive shafts 18 and 19 which extend through and are coaxially disposed relative to height adjusting shafts 20 and 21. Mounted on the free ends of drive shafts 18 and 19 are drive gears 22 and 23.

The construction of the right side of the vehicle, including the height adjusting shaft 20 and the wheel 12 is substantially identical to the left side of the vehicle including the height adjusting shaft 21 and the wheel 11. In view thereof, only the right side of the vehicle as best illustrated in FIGURE 4, will be described, and it will be understood that the construction of the left side of the vehicle is essentially the same.

Referring to FIGURE 4, the adjusting shaft 20 is tubular, and is journaled in bearings 24 and 25, provided in transversely spaced upstanding brackets 26 and 27, which are rigidly secured to the chassis 10. The drive shaft 18 is disposed coaxially relative to the adjusting shaft 20 and is journaled in bearings 28 and 29, which are mounted in the adjusting shaft 20 adjacent the ends thereof. It will be noted that the shafts 18 and 20 are permitted to be rotated independently of each other about their common axis.

Radially disposed on the outer end of the adjusting shaft 20 is a support arm 30, on which the wheel 12 is mounted. Mounted on the support arm and radially offset from the axis of the drive shaft 18, is a gear shaft 31 which is journaled in bearings 32 and 33 mounted in an opening in the outer end of the support arm. Rigidly secured to the outer end of the gear shaft 31 is an idler gear 34 which lies in the same plane as drive gear 22.

The wheel 12 is substantially annular and is mounted on the ends of the support arm 30, so that the support arm 30 is disposed diametrically relative to the wheel 12, as best illustrated in FIGURES 1, 3 and 6. The wheel 12 consists of an annular main body member 35 having a bearing race 36 rotatably supported on ball bearings 37 seated in bearing recesses provided in the opposite ends of the support arm 30, and an annular face plate member 38 having a bearing race 39 rotatably supported on ball bearings 40, supported in bearing recesses provided on the opposite ends of the support arm 30. It will be appreciated that the mounting of the annular wheel member 12 permits the wheel to rotate on the support arm 30 about its center axis. The wheel 12 is rotatably driven about its center axis on the arm member 30 by means of drive transmitted through drive shaft 18 and drive gear 22 which meshes with an internal gear 41 formed in the inner annular surface 42 of the annular main body member 35 of the wheel 12. It further will be seen that the wheel 12 may be rotated about the axis of drive shaft 18 by rotating the height adjusting shaft 20.

As best illustrated in FIGURE 2, an operator's station is provided on the chassis 10 which includes a seat 43 and a control panel 44 mounted within reaching distance of the seat 43. The control panel 44 is provided with various control instruments for controlling the operation of the engine 14 and various other desired operating mechanisms on the vehicle.

The rotation of the shafts 20 and 21 is controlled by a height adjusting control unit 45, which includes a transversely disposed shaft 46 journaled in transversely spaced journal brackets 47 and 48, drive sprockets 49 and 50 mounted on the ends of the shaft 46, and longitudinally disposed, spaced drive chains 51 and 52 which operatively interconnect the drive sprockets 49 and 50 with driven sprockets 53 and 54 rigidly mounted on shafts 20 and 21, respectively, for transmitting rotary drive from the shaft 46 to the shafts 20 and 21. The shaft 36 and the shafts 20 and 21, correspondingly, are rotated by means of a worm gear assembly 55, which includes a spur gear 56 mounted on shaft 46 within a housing 57, and a worm gear 58 meshing with the spur gear 56 within the housing 57, having a crank handle 59 located within easy reach of the vehicle operator seated in seat 43.

To adjust the height of the chassis 10 relative to the ground level, the operator merely turns the handle 59 of the worm gear assembly to rotate shaft 46. The rotational movement of the shaft 46 is transmitted to the shafts 20 and 21 by means of the chain drives 51 and 52, whereby the support arms 30 are rotated about the common axis of shafts 20 and 21 to rotate the wheels 11 and 12 about the axis of shafts 20 and 21, correspondingly. The sequential position of the wheel 12 is illustrated in broken lines in FIGURE 3, with the corresponding ground level illustrated by the broken line 60. It further will be appreciated that the rotation of the support arms 30 about the common axis of shafts 20 and 21 can be accomplished by the use of various other means, including other mechanical, electrical or hydraulic arrangements, or combinations of such arrangements.

The wheel members 11 and 12 are assisted in being maintained in their respective, fixed planes of rotation either about their center axes or the common axis of drive shafts 18 and 19, by means of retainer units 61 which are best illustrated in FIGURES 4, 6 and 7. Each retainer unit comprises a pin 62 disposed substantially parallel to the common axis of drive shafts 18 and 19 and the center axes of rotation of the wheels 11 and 12, which extends between the chassis and the wheel, being received within a longitudinally disposed slot 63 formed in the side of the chassis, and an annular slot 64 formed in the annular face plate member of the wheel 12.

Secured to the inner end of the pin 62 and disposed in an enlarged portion 65 of the longitudinal slot 63 is a carrier member 66 having rollers 67 and 68 supported on the bottom surface of the enlarged portion 65 of the longitudinal slot for rolling movement therealong. The opposite end of the pin 62 is provided with an enlarged circular head portion 69 which is disposed within an enlarged annular portion 70 of the annular slot 64 in the face plate member 38.

It will be appreciated that as the support arms 30 are rotated about the common axis of drive shafts 18 and 19 to rotate the wheels 11 and 12, correspondingly, the carrier units 61 will move longitudinally in the slots 63 and circumferentially in the slots 64 to maintain the wheels 11 and 12 in their respective, fixed planes of rotation. It further is contemplated that other equivalent means can be employed within the scope of the invention to maintain the wheels 11 and 12 in their fixed planes of rotation, and to assist in supporting the same.

The vehicle as illustrated in the drawings is steered by means of a braking system of the type generally used in crawler type tractors and the like. FIGURE 2 illustrates the steering system 71 which includes a pair of braking units 72 and 73 operatively connected to the drive shafts 18 and 19, which units are substantially identical in construction and operation, a pair of control cables 74 and 75 and a pair of control levers 76 and 77 which are positioned within convenient reach of the vehicle operator seated in seat 43.

FIGURES 4 and 5 best illustrate the construction of brake unit 72. The unit comprises a housing member 78, having aligned openings therein for receiving the drive shaft 18 therethrough, a pair of brake shoes 79 and 80 and a brake shoe actuating mechanism 81. The brake shoes 79 and 80 each include arcuate sections 82 and 83 which are pivotally connected at their upper ends to a common pin 84 and encompass the drive shaft 18, and opposed free end sections 85 and 86. The arcuate brake shoe sections 82 and 83 are provided with conventional linings 87 and 88 which are engageable in braking relationship with a brake drum 89 mounted on the drive shaft 18. The brake shoe sections 82 and 83 are biased apart by means of a spring element 90 interconnecting the free end sections of the brake shoes.

The actuating mechanism 81 includes a cam member 91 mounted on a pivot pin 92, which is engageable with the free end sections 85 and 86 of the brake shoes, to force the same apart and cause the brake shoe linings 87 and 88 to engage the brake drum 89. The cam element 91 is pivoted by means of a lever arm 92. The control cable 74 interconnects the arm member 92 of the brake unit 72 and the control lever 76, so that upon manual operation of the control lever 76, the cam member 91 will be pivoted to force the brake shoe end sections 85 and 86 apart, causing the arcuate brake shoe sections 82 and 83 to move together and the brake linings 87 and 88 to contact the brake drum 89, to provide the desired braking action. Upon release of the control lever 76, the spring element 90 will function to move the brake shoe sections 82 and 83 apart and into inoperative positions.

It will be seen from the operation of the steering system that either of the drive shafts 18 or 19 can be braked to stop or retard the rotational movement of either of the wheels 11 or 12, thereby causing the vehicle to turn in the conventional manner as employed by crawler tractor type vehicles. It is possible to apply both of the brakes in order to brake the entire movement of the vehicle. It further is within the contemplated scope of the invention that any other suitable steering arrangement can be employed.

In the operation of the vehicle illustrated in the drawings, the vehicle is propelled by means of drive transmitted from the engine through the transmission and the differential to the drive shafts 18 and 19. Drive is transmitted to the wheels 11 and 12 by means of the operative engagement of the drive gears mounted on the ends of the drive shafts with the internal driven gears provided in the wheels 11 and 12. Whenever it is desired to turn the vehicle, either of the control levers 76 or 77 are operated to brake either of the drive shafts 18 or 19, thereby causing drive to be transmitted to only one wheel, whereupon, the vehicle is caused to turn. When it is desired to adjust the height of the chassis 10, relative to the ground level so as to enable the vehicle to traverse irregular terrain or to cross a body of water, the handle 59 of the worm gear assembly 55 is turned to rotate height adjusting shafts 20 and 21. The rotation of shafts 20 and 21 correspondingly will cause the support arms 30 and the wheels 11 and 12 to rotate about the common axis of drive shafts 18 and 19, and height adjusting shafts 20 and 21, thereby adjusting the effective height of the chassis 10 relative the ground level on which the wheels 11 and 12 are supported.

The invention as described is contemplated for use in both commercial and military applications. Any type of structure can be mounted on the chassis 10, depending on the specific use for which the vehicle is intended. It further is contemplated that the invention constitutes an amphibious vehicle which can be propelled either on land or water. The wheels 11 and 12 can be provided with paddles 93, as illustrated in FIGURE 3. This would permit the chassis 10 to float on the surface of a body of water and be propelled by means of the paddles 93 as the wheels 11 and 12 are rotated about their center axis. When the vehicle is used in such a manner to propel the same on water, it is proposed that the wheels 11 and 12 be raised sufficiently out of the water to reduce their drag effect on the vehicle.

The vehicle as described can be constructed of any suitable materials and by suitable methods consistent with conventional engineering practices and techniques. Where the vehicle is to be employed as an amphibious vehicle, it is proposed that the chassis be constructed of a lightweight material, or be provided with suitable attachments to permit the same to float. It will be appreciated, however, that the invention as described can be employed either on land, and particularly land having an irregular terrain, floating on a body of water, or traversing a body of water with the wheels engaging and having traction with the bed of the body of water.

In lieu of support arms 30, disc members can be used on which the wheels can be mounted for rotational movement. Such discs would be secured to the adjusting shafts 20 and 21 so that they could be rotated about the common axis of such shafts to adjust the height of the chassis 10.

From the foregoing detailed description it will be evident that there are a number of changes, adaptations and modifications of the present invention which come within the province of those skilled in the art. However, it is intended that all such variations not departing from the spirit of the invention be considered as within the scope thereof.

What I claim is:

1. A vehicle comprising a chassis, at least one pair of first and second coaxially disposed shafts mounted on said chassis, said shafts being rotatable independently of each other, a support arm member secured to said first shaft for rotation therewith, a wheel rotatably mounted on the end portions of said arm member whereby said arm member is disposed diametrically relative to said wheel and means for transmitting drive from said second shaft to said wheel for rotating said wheel about its axis.

2. A vehicle according to claim 1, wherein the axes of rotation of said shafts and said wheel are parallel.

3. A vehicle according to claim 1, including prime mover means mounted on said vehicle for driving said second shaft and correspondingly said wheel about its axis for propelling said vehicle.

4. A vehicle according to claim 1, for selectively rotating said first shaft to adjust the level of said chassis relative to the lower end of said wheel.

5. A vehicle according to claim 1, including braking means for said wheel.

6. A vehicle according to claim 1, wherein said means for transmitting drive from said second shaft to said wheel for rotating said wheel about its axis comprises a gearing arrangement.

7. A wheel assembly for a vehicle having a chassis comprising first and second coaxially disposed shafts mounted on said chassis, said shafts being rotatable independently of each other, a support arm member secured to said first shaft for rotation therewith, a wheel rotatably mounted on the end portions of said arm member whereby said arm member is disposed diametrically relative to said wheel and means for transmitting drive from said second shaft to said wheel for rotating said wheel about its axis.

8. A vehicle according to claim 7, wherein said means for transmitting drive from said second shaft to said wheel for rotating said wheel about its axis comprises a gearing arrangement.

9. A vehicle comprising a chassis, at least one shaft journaled in said chassis, said shaft having a support arm mounted thereon for rotational movement about the axis of said shaft, a wheel mounted on said support arm for rotation about an axis offset relative to the axis of said shaft, means for rotating said shaft and means for maintaining said wheel in a fixed plane of rotation comprising at least one slidable retainer pin received in a rectilinear slot in said chassis and an annular slot in said wheel.

10. A vehicle comprising a chassis, at least one shaft journaled in said chassis, said shaft having a support arm mounted thereon for rotational movement about the axis of said shaft, a wheel mounted on said support arm for rotation about an axis offset relative to the axis of said shaft, means for rotating said shaft, said support arm being diametrically disposed relative to said wheel, means for rotating said wheel about its axis for propelling said vehicle including a second drive shaft disposed coaxially with said first mentioned shaft, operatively connected to said wheel by means of a gearing arrangement for transmitting drive thereto, and means for maintaining said wheel in a fixed plane of rotation including at least one retaining pin received in a rectilinear slot in said chassis and an annular slot in said wheel.

11. A vehicle comprising a chassis, at least one shaft journaled in said chassis, said shaft having a support arm mounted thereon for rotational movement above the axis of said shaft, a wheel mounted on said support arm for rotation about an axis offset relative to the axis of said shaft, means for rotating said shaft, said wheel being annular, said support arm being radially disposed relative to the axis of rotation of said shaft and diametrically disposed relative to said wheel, a second drive shaft journaled coaxially in said first mentioned shaft, having a drive gear meshing with a gear disposed on said wheel for transmitting drive therebetween for propelling the vehicle, and means for maintaining said wheel in a fixed plane of rotation including at least one retaining pin received in a rectilinear slot in said chassis and an annular slot in said wheel.

References Cited

UNITED STATES PATENTS

| 1,400,434 | 12/1921 | Harvey | 180—10 |
| 1,198,121 | 9/1916 | Gleiche | 180—41 |
| 1,353,393 | 9/1920 | Haupt | 180—41 |
| 2,215,571 | 9/1940 | White | 180—41 |
| 2,551,314 | 5/1951 | Burton | 180—41 |

A. HARRY LEVY, Primary Examiner

U.S. Cl. X.R.

115—1; 188—74; 180—6.2, 85, 27; 280—43.17